United States Patent [19]

Eimers et al.

[11] 4,046,742
[45] Sept. 6, 1977

[54] COMPOSITIONS CONTAINING HYDROXYL GROUPS AND THEIR USE FOR THE PRODUCTION OF FLAMEPROOF PLASTICS

[75] Inventors: Erich Eimers; Rolf Dhein, both of Krefeld-Bockum; Rolf Wiedermann, Bergisch-Gladbach, all of Germany

[73] Assignee: Bayer Aktiengesellschaft, Leverkusen, Germany

[21] Appl. No.: 620,725

[22] Filed: Oct. 8, 1975

[30] Foreign Application Priority Data

Oct. 24, 1974 Germany .............................. 2450540

[51] Int. Cl.² .................... C08G 18/42; C08G 18/14; C09K 3/28
[52] U.S. Cl. .......................... 260/77.5 AN; 252/182; 260/2.5 AN; 260/2.5 AP; 260/47 R; 260/47 EP; 260/77.5 AP; 260/77.5 NC
[58] Field of Search .................. 260/2.5 AP, 77.5 AP, 260/77.5 AN, 77.5 NC, 47 R, 47 EP; 252/182

[56] References Cited

U.S. PATENT DOCUMENTS

| 3,265,641 | 8/1966 | Wismer et al. | 260/77.5 AP |
|---|---|---|---|
| 3,457,225 | 7/1969 | Damusis | 260/77.5 AP |
| 3,919,128 | 11/1975 | Baldino et al. | 260/2.5 AP |
| 3,957,922 | 5/1976 | Austin et al. | 260/2.5 AP |

*Primary Examiner*—H.S. Cockeram
*Attorney, Agent, or Firm*—Gene Harsh; Joseph C. Gil

[57] ABSTRACT

The instant invention is broadly directed to novel hydroxyl containing compositions and the use thereof in producing polyurethane resins. The novel products are produced by mixing a halogenated bisphenol with a hydroxypolyester and thereafter alkoxylating the mixture.

6 Claims, No Drawings

COMPOSITIONS CONTAINING HYDROXYL GROUPS AND THEIR USE FOR THE PRODUCTION OF FLAMEPROOF PLASTICS

BACKGROUND OF THE INVENTION

Bis-β-hydroxy alkyl ethers of halogenated bisphenols are known and are used as hydroxy components for the production of flame resistant synthetic resins. These bis-ethers are generally solid, crystalline or vitreous (i.e. glass-like) resins. The esters produced from these ethers and dicarboxylic acids are also known and have already been used in the production of flameproof plastics. Canadian Pat. No. 663,542 relates, for example, to the production of an ester by esterifying bis-β-hydroxy ethyl dibromobisphenol and 1,2-propylene glycol with a mixture of phthalic acid anhydride and maleic acid anhydride. This ester contains 25.2% of bromine and is a glass-like resin at room temperature. However, to produce polyurethane and polyisocyanurate plastics, it is advantageous for the starting components to be in the form of low-viscosity liquids to enable the foaming mixture to be poured.

Polyethers containing free hydroxyl groups such as, for example, polyethylene glycol or polypropylene glycol, have long been used as low-viscosity components for the production of polyurethane and polyisocyanurate plastics. The polyethers of bisphenols containing hydroxyl groups are also known for this purpose. However, it is apparent from U.S. application Ser. No. 373,230, filed June 25, 1973, now abandoned, that polyethers of halogenated bisphenols cannot be produced under normal manufacturing conditions. The treatment of highly halogenated bisphenols, such as, tetrabromobisphenol, with alkylene oxides in the formation of bis-ethers of the kind referred to above, even in cases where an excess of alkylene oxide is used.

It would be an obvious solution to dissolve these bis-ethers in low-viscosity polyalkylene glycols in order to incorporate them as halogen carriers into the foaming mixture for producing substantially non-inflammable plastics. Unfortunately, the solublity of these bis-ethers in hydroxyl compounds of this kind is very poor. The ether quickly crystallizes out from solutions in which it is present in the high concentrations required, or alternatively the solution solidifies into a solid crystalline mass which can no longer be poured. According to U.S. Application No. 373,230, it is possible to obtain low-viscosity, pourable polyether derivatives of halogenated bisphenols. To achieve this, the polyethers of halogen-free bisphenols containing hydroxyl groups are initially prepared in known manner and are subsequently halogenated by treatment with elemental halogen, such as bromine. The polyethers thus obtained have a pourable consistency and the foams produced from them, especially polyisocyanurate foams, show outstanding flameproof properties. Unfortunately, they have the disadvantage that they tend to turn brittle at their surface and they exhibit poor bond strength with surface layers. In addition, the process described in the aforementioned U.S. application is complicated by the fact that polyetherification and halogenation are two completely different reactions each of which has to be carried out in specially designed apparatus and, hence, in two separate production units. The considerable outlay on apparatus (the use of corrosion-proof apparatus, for example, of special steels) involved in halogenation necessitates obtaining as high a degree of halogenation as possible in order to make the fullest possible use of the reaction. Accordingly, it is more rational, in order to produce a halogen-containing, substantially non-inflammable plastic or intermediate product, to start with a highly halogenated starting material than it is to subsequently halogenate the particular plastics material used or the intermediate product to a correspondingly lower degree of halogenation.

DESCRIPTION OF THE INVENTION

It has now been found that intermediate products for the production of substantially flame-resistant plastics having favorable properties can be obtained in a particularly simple manner by treating a solution of a halogenated bis-phenol in a hydroxyl-containing polyester of a dicarboxylic acid and a glycol under heat with an alkylene oxide until the free phenolic groups have been substantially quantitatively alkoxylated. The resulting products, which have virtually no acid number, are pourable, viscous oils which remain liquid, even when stored at low temperatures. This is particularly surprising because, as demonstrated hereinafter in a comparison test, a composition having the same gross constitution prepared using separately produced bis-β-hydroxyalkyl halogen bisphenol ether is converted into a non-pourable, pasty composition during storage as a result of the bis-ether crystallizing out. According to the invention, it is readily possible to obtain products which have acid numbers of less than 1.

Accordingly, the invention relates to compositions containing hydroxyl groups which have an acid number of less than 1 and a hydroxyl number of from 150 to 300, preferably from 180 to 250, obtained by mixing 25 to 75% by weight, and preferably 40 to 60% by weight, of a halogenated 2,2-diphenylol propane corresponding to the general formula

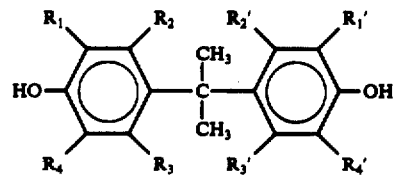

in which $R_1$, $R_2$, $R_3$, $R_4$, $R_1'$, $R_2'$, $R_3'$, and $R_4'$ may be the same or different and represent H, $C_1$-$C_4$-alkyl, or halogen, at least 1 R is halogen, and is preferably Cl or Br, with 75 to 25% by weight and preferably with 60 to 40% by weight of a polyester containing hydroxyl groups obtained from saturated, unsaturated or halogenated aliphatic and/or cycloaliphatic and/or aromatic polycarboxylic acids and a molar excess of dialcohols corresponding to the following formula:

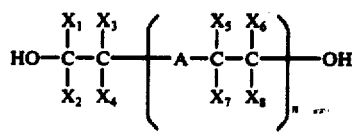

in which
$X_1$ to $X_8$ = H or $C_1$-$C_4$-alkyl, and preferably represents H, $CH_3$ or $C_2H_5$,
$n = 1 - 10$,
A = O or S and by subsequently alkoxylating the aforementioned mixture with an alkylene oxide corresponding to the formula:

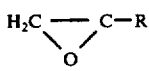

in which

R = H, $CH_3$, $CH_2OH$, $CH_2Cl$, $CH_2Br$ or $C_2H_5$.

The compositions prepared in accordance with the invention generally have a viscosity in the range from 10 to 200 poises at 25° C and preferably in the range from 20 to 100 poises at 25° C.

Acids which are suitable for use in the production of the polyesters which contain hydroxyl groups include aliphatic, cycloaliphatic and aromatic polycarboxylic acids, such as, carbonic acid, oxalic acid, malonic acid, succinic acid, maleic acid, fumaric acid, itaconia acid, adipic acid, sebacic acid, dichlorosuccinic acid, cyclohexane dicarboxylic acid, tetrahydrophthalic acid, 4,5-dibromocyclohexane-1,2-dicarboxylic acid, o-, iso- and terephthalic acid, tetrachlorophthalic acid, tetrabromophthalic acid, endomethylene tetrahydrophthalic acid, endomethylene hexachlorotetrahydrophthalic acid, diglycolic acid, thiodiglycolic acid, citric acid, tartaric acid and maleic acid. Instead of using the free polycarboxylic acids, it is also possible to use the corresponding carboxylic acid anhydrides or corresponding polycarboxylic acid esters of lower alcohols. The aforementioned acids may be used either individually or even in admixture for producing the polyesters.

Polyalcohols of the above general formula which are suitable for esterification with the dicarboxylic acids are, in particular, compounds of the following kind:

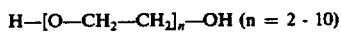

Examples of compounds such as these are diethylene glycol and triethylene glycol. It is also possible to use thiodiglycol, bis-β-hydroxy ethyl sulphone and the polyesters and polythioethers specified hereinafter, also dipropylene glycol and polypropylene glycol corresponding to the formula:

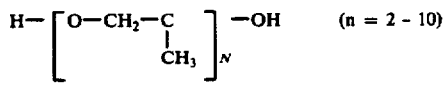

In addition to the aforementioned diols, it is also possible to use up to 20 mol % of monoalkylene glycols such as, for example, ethylene glycol, 1,2-propylene glycol, 1,2-butylene glycol, neopentyl glycol, α-chlorhydrin, for esterification.

Esterification is generally carried out at temperatures in the range from 120° to 200° C and preferably at temperatures in the range from 160° to 180° C, under normal pressure and/or in vacuo in the presence of an inert gas. Esterification catalysts such as toluene sulphonic acid, litharge, dibutyl tin oxide, antimony trioxide, salts and alcoholates of titanium, may be added. Although esterification may be carried out in the presence of solvents acting as azeotropic entraining agents, it is preferably carried out in the absence of solvents.

In general, it would seem to be advisable to continue esterification until as low an acid number as possible is reached. Nevertheless, it can be advantageous in certain cases (for example in order to improve compatibility with the bisphenols to be dissolved in the polyester) to terminate esterification at a relatively high acid number and subsequently to alkyxylate the free carboxyl groups together with the free phenol groups of the bisphenol to be added.

The hydroxyl-containing polyesters thus obtained are mixed with the halogenated bisphenols, preferably under heat, a solution generally being formed. Although tetrabromobisphenol is most preferably used as the bisphenol, it is also preferable to use dibromobisphenol or tetrachlorobisphenol.

The bisphenol/polyester mixtures are then alkoxylated. Alkoxylation may be carried out in known manner. Catalysts which are preferably used for accelerating the reaction include alkaline-reacting substances such as NaOH, KOH, sodium methylate, sodium phenolate, potassium acetate, potassium carbonate, and the like. Alkoxylation is carried out at temperatures in the range from 80° to 180° C and preferably at temperatures in the range from 110° to 130° C. The alkylene oxides used correspond to the general formula:

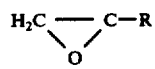

in which R = H, $CH_3$, $CH_2OH$, $CH_2Cl$, $CH_2Br$ or $C_2H_5$. Specific examples include ethylene oxide, 1,2-propylene oxide, epichlorhydrin and 1,2-butylene oxide.

The end point of alkoxylation is readily determined by titrating a sample of the reaction mixture with sodium hydroxide using the technique normally adopted for determining acid number.

The compositions produced in accordance with the invention are valuable starting materials for the production of isocyanate-based plastics, and especially for the production of substantially non-flammable isocyanurate foams having outstanding mechanical properties and non-flammability.

The starting isocyanates suitable for use in accordance with the invention in the production of plastics include aliphatic, cycloaliphatic, araliphatic, aromatic and heterocyclic polyisocyanates of the type described, for example by W. Siefken in Justus Liebigs Annalen der Chemie, 562, pages 75 to 136. Examples include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and 1,4-diisocyanate, and mixtures of these isomers; 1-isocyanato-3,3,5-trimethyl-5-isocyanatomethyl cyclohexane (German Auslegeschrift Pat. No. 1,202,785, U.S. Pat. No. 3,401,190), 2,4- and 2,6-hexahydrotolylene diisocyanate and mixtures of these isomers; hexahydro-1,3- and/or -1,4-phenylene diisocyanate; perhydro-2,4'- and/or -4,4'-diphenyl methane diisocyanate; 1,3- and 1,4-phenylene diisocyanate; 2,4- and 2,6-tolylene diisocyanate, and mixtures of these isomers; diphenyl methane-2,4'- and/or -4,4'-diisocyanate; naphthylene-1,5-diisocyanate; triphenyl methane-4,4',4''-triisocyanate; polyphenyl polymethylene polyisocyanates of the type obtained by condensing aniline with formaldehyde, followed by phosgenation, is described in British Pat. Nos. 874,430 and 848,671; m- and p-isocyanatophenyl sulphonyl isocyanates as described in U.S. Pat. No. 3,454,606; perchlorinated aryl polyisocyanates of the type described in U.S. Pat. No. 3,277,138; polyisocyanates containing carbodiimide groups of the type described in U.S. Pat. No. 3,152,162; diisocyanates of the type described in U.S. Pat. No. 3,492,330; polyisocyanates containing allophanate groups of the type described in British Pat. No. 994,890, Belgian Pat. No. 761,626 and Published Dutch Pat. application No. 7,102,524; polyisocyanates containing isocyanurate groups of the type described in U.S. Pat. No. 3,001,973, in German Pat. Nos. 1,022,789; 1,222,067 and 1,027,394 and in German Offenlegungsschrifts Nos. 1,929,034 and 2,004,048; polyisocyanates containing urethane groups of the type described, in Belgian Pat. No. 752,261 or in U.S. Pat. No. 3,394,164; polyisocyanates with acylated urea groups as described in German Pat. No. 1,230,778; polyisocyanates containing biuret groups of the type described in U.S. Pat. Nos. 3,124,605 and 3,201,372 and in British Pat. No. 889,050; polyisocyanates obtained by telomerization reactions of the type described, in U.S. Pat. No. 3,654,106; polyisocyanates containing ester groups of the type described in British Pat. Nos. 965,474 and 1,072,956; in U.S. Pat. No. 3,567,763 and in German Pat. No. 1,231,688; reaction products of the aforementioned isocyanates with acetals is described in German Pat. No. 1,072,385; and, polyisocyanates containing polymeric fatty acid radicals as described in U.S. Pat. No. 3,455,883. It is also possible to use the distillation residues containing isocyanate groups which accumulate during the commercial scale production of isocyanates, optionally in solution in one or more of the above-mentioned polyisocyanates. It is also possible to use any mixtures of the aforementioned polyisocyanates.

In general, it is preferred to use available polyisocyanates such as 2,4- and 2,6-tolylene diisocyanate, and mixtures of these isomers ("TDI"); polyphenyl polymethylene polyisocyanates of the type obtained by condensing aniline with formaldehyde, followed by phosgenation ("crude MDI"); and polyisocyanates containing carbodiimide groups, urethane groups, allophanate groups, isocyanurate groups, urea groups or biuret groups ("modified polyisocyanates").

According to the invention, water and/or readily volatile organic substances can be used as blowing agents. Examples of organic blowing agents include acetone; ethyl acetate; halogen-substituted alkanes such as methylene chloride, chloroform, ethylidene chloride, vinylidene chloride, monofluorotrichloromethane, chlorodifluoromethane, dichlorodifluoromethane; butane; hexane; heptane; and diethyl ether. A blowing effect can also be obtained by adding compounds which decompose at temperatures above room temperature to give off gases such as nitrogen, for example azo compounds, such as azoisobutyronitrile. Further examples of blowing agents and information on the use of blowing agents may be found in Kunststoff-Handbuch, Vol. VII, Published by Vieweg und Hochtlen, Carl-Hanser-Verlag, Munich 1966, pages 108 and 109, 453 to 455 and 507 to 510.

Where isocyanurate products are desired, catalysts used for the polymerization reactions are used, and include compounds which initiate a polymerization reaction involving the NCO-group at temperatures as low as room temperature. Examples of this kind of catalyst are described, for example, in French Pat. No. 1,441,565, Belgian Pat. Nos. 723,153 and 723,152 and German Pat. No. 1,112,285. Catalysts of this kind include, mononuclear or polynuclear Mannich bases of condensible phenols optionally substituted by alkyl, aryl or aralkyl radicals, oxo compounds and secondary amines, especially those in which formaldehyde has been used as the oxo compound and dimethyl amine as the secondary amine. According to analyses by IR-spectroscopy, more or less large proportions of carbodiimide structures are generally formed in the foams, depending upon the conditions, especially upon the reaction temperature reached. Other suitable polyisocyanate catalysts are the alkali and alkaline-earth salts of carboxylic acids and phenols. The quantity of polymerization catalyst is essentially determined by the type (and optionally the basicity) of the catalyst used. It is possible to use from 0.1 to 100% by weight and preferably from 0.3 to 25% by weight of catalyst component, based on the isocyanate component.

According to the invention, the polyurethane reaction may be catalyzed by the usual catalysts, for example tertiary amines, such as triethyl amine, tributyl amine, N-methyl morpholine, N-ethyl morpholine, N-cocomorpholine, N,N,N',N'-tetramethyl ethylene diamine, 1,4-diazabicyclo-(2,2,2)-octane, N-methyl N'-dimethyl aminoethyl piperazine, N,N-dimethyl benzyl amine, bis-(N,N-diethyl aminoethyl)-adipate, N,N-diethyl benzyl amine, pentamethyl diethylene triamine, N,N-dimethyl cyclohexyl amine, N,N,N',N'-tetramethyl-1,3-butane diamine, N,N-dimethyl-$\beta$-phenyl ethyl amine, 1,2-dimethyl imidazole and 2-methyl imidazole.

Tertiary amines containing isocyanate-reactive hydrogen atoms may also be used and include triethanolamine, triisopropanolamine, N-methyl diethanolamine, N-ethyl diethanolamine, N,N-dimethyl ethanolamine, also their reaction products with alkylene oxides such as propylene oxide and/or ethylene oxide.

Other suitable catalysts are sila-amines having carbonsilicon bonds of the type described in German Pat. No. 1,229,290, including 2,2,4-trimethyl-2-silamorpholine and 1,3-diethyl aminomethyl tetramethyl disiloxane.

According to the invention, organometallic compounds, especially organo tin compounds, may also be used as catalysts.

Preferred organo tin compounds are tin(II) salts of carboxylic acids such as tin(II)acetate, tin(II)octoate, tin(II)-ethyl hexoate and tin(II)laurate, and the dialkyl tin salts of carboxylic acids, such as for example dibutyl tin diacetate, dibutyl tin dilaurate, dibutyl tin maleate or dioctyl tin diacetate.

Other examples of catalysts suitable for use in accordance with the invention and information on the way in which the catalysts work may be found in Kunststoff-Handbuch, Vol. VII, Published by Vieweg und Hochtlen, Carl-Hanser-Verlag, Munich 1966, on pages 96 to 102.

These catalysts are generally used in quantities of from about 0.001 to 10% by weight, based on the total weight of the novel compositions described herein and any compounds mentioned hereinafter having at least two isocyanate-reactive hydrogen atoms and a molecular weight in the range from 62 to 10,000.

According to the invention, it is also possible to use surface-active additives (emulsifiers and foam stabilizers). Examples of emulsifiers are the sodium salts of castor oil sulphonates or even of fatty acids or salts of fatty acids with amines, such as diethyl amine oleate or diethanolamine stearate. It is also possible to use alkali or ammonium salts of sulphonic acids, for example of dodecyl benzene sulphonic acid or dinaphthyl methane disulphonic acid, or even of fatty acids such as ricinoleic acid, or polymeric fatty acids, as surface-active additives.

Especially suitable foam stabilizers are water-soluble polyether siloxanes. The structure of these compounds is generally such that a copolymer of ethylene oxide and propylene oxide is attached to a polydimethyl siloxane radical. Foam stabilizers of this kind are described, for example, in U.S. Pat. Nos. 2,834,748; 2,917,480 and 3,629,308.

According to the invention, it is also possible to use reaction retarders, for example acid-reacting substances such as hydrochloric acid, or organic acid halides; cell regulators known per se, such as paraffins or fatty alcohols or dimethyl polysiloxanes; pigments or dyes; flameproofing agents known per se, for example tris-chloroethyl phosphate or ammonium phosphate and polyphosphate; stabilizers against the effects of ageing and weather; plasticizers and fungistatic and bacteriostatic substances; and fillers such as barium sulphate, kieselguhr, carbon black or prepared chalk.

Further examples of the surface-active additives and foam stabilizers, cell regulators, reaction retarders, stabilizers, flameproofing substances, plasticizers, dyes and fillers, fungistatic and bacteriostatic substances, optionally used in accordance with the invention and information on the way in which these additives are used and the way in which they work, may be found in Kunststoff-Handbuch, Vol. VII, Published by Vieweg und Hochtlen, Carl-Hanser-Verlag, Munich 1966, pages 103 to 113.

Other suitable components suitable in accordance with the invention for use in the production of plastics are compounds having at least two isocyanate-reactive hydrogen atoms and a molecular weight of generally from 400 to 10,000. In addition to compounds containing amino groups, thiol groups or carboxyl groups, compounds of this kind are, preferably, polyhydroxyl compounds, and in particular compounds containing 2 to 8 hydroxyl groups, especially those having molecular weights in the range from 800 to 10,000, preferably from 1,000 to 6,000. Examples include polyesters, polyethers, polythioethers, polyacetals, polycarbonates, polyester amides containing at least 2, generally 2 to 8 but preferably 2 to 4 hydroxyl groups, of the type commonly used for the production of homogeneous and cellular polyurethanes.

The hydroxyl-containing polyesters used in accordance with the invention include reaction products of polyhydric, preferably dihydric and, optionally, trihydric alcohols with polyvalent, preferably divalent, carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may optionally be substituted, for example by halogen atoms, and/or unsaturated. Examples of polycarboxylic acids of this kind are succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid, optionally in admixture with monomeric fatty acids, terephthalic acid dimethyl ester and terephthalic acid bis-glycol ester. Examples of suitable polyhydric alcohols are ethylene glycol, 1,2-and 1,3-propylene glycol, 1,4- and 2,3-butylene glycol, 1,6-hexane diol, 1,8-octane diol, neopentyl glycol, cyclohexane dimethanol (1,4-bis-hydroxy methyl cyclohexane), 2-methyl-1,3-propane diol, glycerol, trimethylol propane, 1,2,6-hexane triol, 1,2,4-butane triol, trimethylol ethane, pentaerythritol, quinitol, mannitol and sorbitol, methyl glycoside, also diethylene glycol, triethylene glycol, tetraethylene glycol, polyethylene glycols, dipropylene glycol, polypropylene glycols, dibutylene glycol and polybutylene glycols. The polyesters may contain terminal carboxyl groups. It is also possible to use polyesters of lactones, for example $\epsilon$-caprolactone or hydroxy carboxylic acids, for example $\omega$-hydroxy caproic acid.

The polyethers containing at least two, generally two to eight and preferably two to three hydroxyl groups used in accordance with the invention are also known per se and are obtained, for example, by polymerizing epoxides such as ethylene oxide, propylene oxide, butylene oxide, tetrahydrofuran, styrene oxide or epichlorhydrin alone, for example in the presence of $BF_3$, or by dding these epoxides, optionally in admixture or in succession, to starting components having reactive hydrogen atoms such as water, alcohols or amines, including ethylene glycol, 1,3- or 1,2-propylene glycol, trimethylol propane, 4,4'-dihydroxy diphenyl propane, aniline, ammonia, ethanolamine and ethylene diamine. Sucrose polyethers, of the type described in German Auslegeschrifts Pat. Nos. 1,176,358 and 1,064,938, may also be used in accordance with the invention. In many cases, it is preferred to use polyethers of the type which contain predominant amounts of primary OH-groups (up to 90% by weight, based on all the OH-groups present in the polyether). Polyethers modified by vinyl polymers, of the type formed for example by polymerizing styrene and acrylonitrile in the presence of polyethers (U.S. Pat. Nos. 3,383,351; 3,304,273; 2,523,093; 3,110,695; and, German Pat. No. 1,152,536), are also suitable, as are polybutadienes containing OH-groups.

Among the polythioethers, reference is made to the condensation products of thiodiglycol on its own and/or with other glycols, dicarboxylic acids, formaldehyde, aminocarboxylic acids or aminoalcohols. Depending upon the cocoponents, the products are polythio mixed ethers, polythioether esters or polythioether ester amides.

Examples of suitable polyacetals include the compounds which can be obtained from glycols such as diethylene glycol, triethylene glycol, 4,4'-dioxethoxy diphenyl dimethyl methane, hexane diol and formaldehyde. Polyacetals suitable for the purposes of the invention can also be obtained by polymerizing cyclic acetals.

The hydroxyl-containing polycarbonates used are known per se and may be obtained by reacting diols (such as 1,3-propane diol, 1,4-butane diol and/or 1,6-hexane diol, diethylene glycol, triethylene glycol and tetraethylene glycol) with diaryl carbonates (for example diphenyl carbonate) or phosgene.

The polyester amides and polyamides include the predominantly linear condensates obtained from polyvalent, saturated and unsaturated carboxylic acids or their anhydrides and polyhydric, saturated and unsaturated aminoalcohols, diamines, polyamines and mixtures thereof.

Polyhydroxyl compounds already containing urethane or urea groups, and optionally modified natural polyols, such as castor oil, carbohydrates and starch, may also be used. Addition products of alkylene oxides with phenol-formaldehyde resins, or even with urea-formaldehyde resins, may also be used in accordance with the invention.

Examples of these compounds suitable for use in accordance with the invention are described, for example, in High Polymers, Vol. XVI, "Polyurethanes, Chemistry and Technology," by Saunders-Frisch, Interscience Publishers, New York, London, Vol. I, 1962, pages 32 to 42 and pages 44 to 54, and Vol. II, 1964, pages 5 to 6 and 198 to 199, and in Kunststoff-Handbuch, Vol. VII, Vieweg und Hochtlen, Carl-Hanser-Verlag, Munich 1966, on pages 45 to 71.

Other starting components suitable for use in accordance with the invention are compounds having at least two isocyanate-reactive hydrogen atoms and molecular weights in the range from 32 to 400. In this case, too, compounds of this kind are compounds containing hydroxyl groups and/or amino groups and/or thiol groups and/or carboxyl groups and are preferably compounds containing hydroxyl groups and/or amino groups and which are used as chain extenders or crosslinking agents. Compounds of this kind generally contain from 2 to 8 isocyanate-reactive hydrogen atoms, preferably 2 or 3 reactive hydrogen atoms. The following are mentioned as examples of compounds such as these: ethylene glycol, 1,2- and 1,3-propylene glycol, 1,4-butylene glycol and 2,3-butylene glycol, 1,5-pentane diol, 1,6-hexane diol, 1,8-octane diol, neopentyl glycol, 1,4-bis-hydroxy methyl cyclohexane, 2-methyl-1,3-propane diol, glycerol, trimethylol propane, 1,2,6-hexane triol, trimethylol ethane, pentaerythritol, quinitol, mannitol and sorbitol, diethylene glycol, triethylene glycol, tetraethylene glycol, polyethylene glycols having a molecular weight of up to 400, dipropylene glycol, polypropylene glycols having a molecular weight of up to 400, dibutylene glycol, polybutylene glycols, having a molecular weight of up to 400, 4,4'-dihydroxy diphenyl propane, dihydroxy methyl hydroquinone, ethanolamine, diethanolamine, triethanolamine, 3-aminopropanol, ethylene diamine, 1,3-diaminopropane, 1-mercapto-3-aminopropane, 4-hydroxy- or -aminophthalic acid, succinic acid, adipic acid, hydrazine, N,N'-dimethyl hydrazine and 4,4'-diaminodiphenylmethane.

According to the invention, the reaction components can be reacted by the one-pot process known per se, by the prepolymer process or by the semi-prepolymer process, in many cases using machines of the type described, for example, in U.S. Pat. No. 2,764,565. Information on other processing machines which may be used for the purposes of the invention may be found in Kunststoff-Handbuch, Vol. VI, Published by Vieweg und Hochtlen, Carl-Hanser-Verlag, Munich 1966, pages 121 to 205.

Examination of the isocyanurate foams produced in accordance with the invention by IR-spectroscopy reveals high proportions of isocyanurate rings in addition to small quantities of carbodiimide groups.

The foams obtained in accordance with the invention may be used as insulating materials in the building industry or in engineering or as a structural material and in the furniture industry.

The compositions obtained in accordance with the invention may also be used as starting materials in the production of cellular or homogeneous polyurethane plastics which, in turn, may be used for coating, insulation or for lacquering.

EXAMPLE 1

Production of the hydroxyl-containing polyester 750 parts by weight of triethylene glycol and 403 parts by weight of adipic acid are heated for 6 hours to 170° C in the presence of 2 parts by weight of titanium tetrabutylate. At the same time, nitrogen is passed through the reactor. The reaction mixture has an acid number of 47.5 mg. of KOH/g. A vacuum of 20 Torr is then applied and the reaction solution is heated for another 8 hours to 170° C. The acid number is then less than 1.

A. COMPARISON TEST 50 parts by weight of bis-β-hydroxy ethyl tetrabromobisphenol ether are added to 50 parts by weight of the hydroxyl-containing polyester prepared in accordance with Example 1 and dissolved under heat to form a clear solution. On cooling to room temperature, the bis-ether crystallizes out again. After a while in finely crystalline form, the mass becomes pasty and can no longer be poured.

B. FURTHER PROCESSING IN ACCORDANCE WITH THE INVENTION 51.6 parts by weight of the hydroxyl-containing polyester prepared in accordance with Example 1 are dissolved under heat with 48.4 parts by weight of tetrabromobisphenol and heated to 120° C. Following the addition of 2 g of sodium phenolate, ethylene oxide is introduced into vigorous stirring until the titration of a sample of the reaction mixture with NaOH-solution reveals no further consumption of alkali. The reaction product is then heated in vacuo for 1 hour to 100° C in order to remove unreacted ethylene oxide. A yellowish colored oil having the following characteristics is obtained:

| | |
|---|---|
| Viscosity | 61 P/25° C |
| Bromine content | 26.1 to 3% |
| Hydroxyl number | 199 to 200 |
| Phenol group content | <0.1% |

EXAMPLE 2

A mixture of 30 parts by weight of the composition prepared in accordance with Example 1B, 10 parts by weight of trichloroisopropyl phosphate, 3 parts by weight of an aminopolyether (propoxylated ethylene diamine having an OH-number of 650), 1 part by weight of glycerol, 1 part by weight of a standard commercial-grade foam stabilizer, (L 5320, Union Carbide Co.), 1.5 parts by weight of a 25% by weight solution of potassium acetate in diethylene glycol and 22 parts by weight of trichlorofluoromethane, is mixed in a foaming machine (type HK 500 manufactured by Messrs. Henneck-e/Birlinghoven) with 100 parts by weight of a prepolymer containing isocyanate groups produced from 95 parts by weight of crude 4,4'-diphenyl methane diisocyanate, (NCO content 31% b.w.), and 5 parts by weight of a polypropylene glycol having an OH-number of 200. The reaction mixture is introduced for 15 seconds into a mold having a base area of 1 × 1 meter. The foam rises to a height of 52 cm and sets after 45 seconds.

The foam predominantly containing polyisocyanurate groups has a gross density of 34.7 kg/m³ and is "substantially non-flammable" according to DIN 41 02. The foam block can be used in the form of sheeting, rough half-shells, as an insulating material in the building industry and for insulating pipes.

What is claimed is:

1. A composition containing hydroxyl groups which has an acid number of less than 1 and a hydroxyl number in the range from 150 to 300 obtained by mixing 25 to 75% by weight of a halogenated 2,2-diphenylol propane corresponding to the general formula

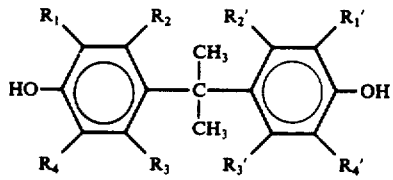

in which
$R_1$, $R_2$, $R_3$, $R_4$, $R_1'$, $R_2'$, $R_3'$, $R_4'$ represents H, $C_1$-$C_4$-alkyl, or halogen, at least 1 R = halogen, with 75 to 25% by weight of a polyester containing hydroxyl groups, obtained from saturated, unsaturated or halogenated aliphatic and/or cycloaliphatic and/or aromatic polycarboxylic acids, and a molar excess of dialcohols corresponding to the following formula

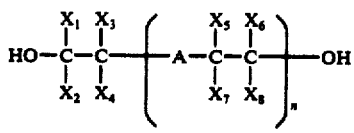

in which
$X_1$ to $X_8$ = H, or $C_1$-$C_4$-alkyl,
$n = 1 - 10$,
$A = O$ or $S$ and by subsequently alkoxylating in the presence of alkaline reacting substances the aforementioned mixture with the alkylene oxide corresponding to the formula

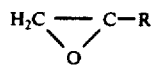

in which $R = H$, $CH_3$, $CH_2OH$, $CH_2Cl$, $CH_2Br$, $C_2H_5$.

2. The composition of claim 1 having a hydroxyl number of from 180 to 250 wherein from 40 to 60% by weight of said halogenated 2,2-diphenylolpropane and 60 to 40% by weight of said polyester are used, and, wherein at least one R is either chlorine or bromine.

3. The composition of claim 1, wherein a halogenated 2,2-diphenylol propane is mixed in a polyester containing hydroxyl groups and the resulting mixture treated with alkylene oxide at a temperature in the range from 80° to 180° C until the phenolic groups have been substantially quantitatively etherified.

4. The composition of claim 1 obtained by mixing 45 to 55% by weight of tetrabromobisphenol with 55 to 45% by weight of a polyester, obtained by esterifying 2.25 to 2.75 mols of triethylene glycol with 1.25 to 1.5 mols of adipic acid, and treating the mixture with ethylene oxide at 110° to 130° C until the phenol groups have been substantially completely reacted.

5. In a process for preparing polyurethane by reacting a polyisocyanate with a reactive hydrogen containing material, the improvement comprising employing as the active hydrogen containing material, a material comprising the composition of claim 1.

6. In a process for preparing the polyisocyanurate resin by polymerizing a polyisocyanate in the presence of an active hydrogen containing material, the improvement comprising employing as the active hydrogen containing material, a material comprising the composition of claim 1.

* * * * *